United States Patent [19]
Lang et al.

[11] Patent Number: 5,238,308
[45] Date of Patent: Aug. 24, 1993

[54] ADJUSTABLE GAP HYDROSTATIC ELEMENT

[75] Inventors: Ko-Wei Lang, West Hills; Joseph K. Scharrer, Newbury Park; Robert F. Beatty, West Hills; Nandor L. Gaspar, Canoga Park, all of Calif.

[73] Assignee: Rockwell International Corporation, Seal Beach, Calif.

[21] Appl. No.: 878,069

[22] Filed: May 4, 1992

[51] Int. Cl.⁵ .................. F16C 32/00; F16C 32/06; F16C 33/72; F16J 15/34
[52] U.S. Cl. .................................. 384/1; 384/100; 384/114; 384/119; 384/130; 277/28; 277/901
[58] Field of Search ............... 384/1, 100, 114, 119, 384/130, 150; 277/28, 901

[56] References Cited

U.S. PATENT DOCUMENTS

| | | | |
|---|---|---|---|
| 3,529,476 | 9/1970 | Lautzenhiser | 384/1 X |
| 4,533,186 | 8/1985 | Engwall et al. | 384/1 |
| 4,643,437 | 2/1987 | Salant et al. | 277/901 X |
| 4,666,315 | 5/1987 | Scranton | 384/1 |
| 4,691,276 | 9/1987 | Miller et al. | 277/901 X |
| 4,809,354 | 2/1989 | Kawashima | 384/114 |
| 4,850,719 | 7/1989 | Moseley et al. | 384/1 |

OTHER PUBLICATIONS

R. F. Salant, A. L. Miller, P. L. Kay, J. Kozlowski, W. E. Key, M. C. Algrain and O. Giles, "Development of an Electronically Controlled Mechanical Seal" Apr. 1987, 11th International Conference on Fluid Sealing, BHRA Nau Editor pp. 576–595.

Brochure, Vernitron Corporation "Guide to Modern Piezoelectric Ceramics" no date.

Primary Examiner—Thomas R. Hannon
Attorney, Agent, or Firm—H. Fredrick Hamann; Harry B. Field; Steven E. Kahm

[57] ABSTRACT

Adjustable gap hydrostatic bearings and adjustable gap seals wherein the adjustable gaps are useful to compensate for wear, thermal expansion, journal speed, and radial deflection of the journal. A housing 10 is adjacent to a journal 2. The housing contains an annular electrodeformable material 5 which will expand or contract radially with the application of voltage and thus adjust the gap between the liner material 3 and the journal.

9 Claims, 3 Drawing Sheets

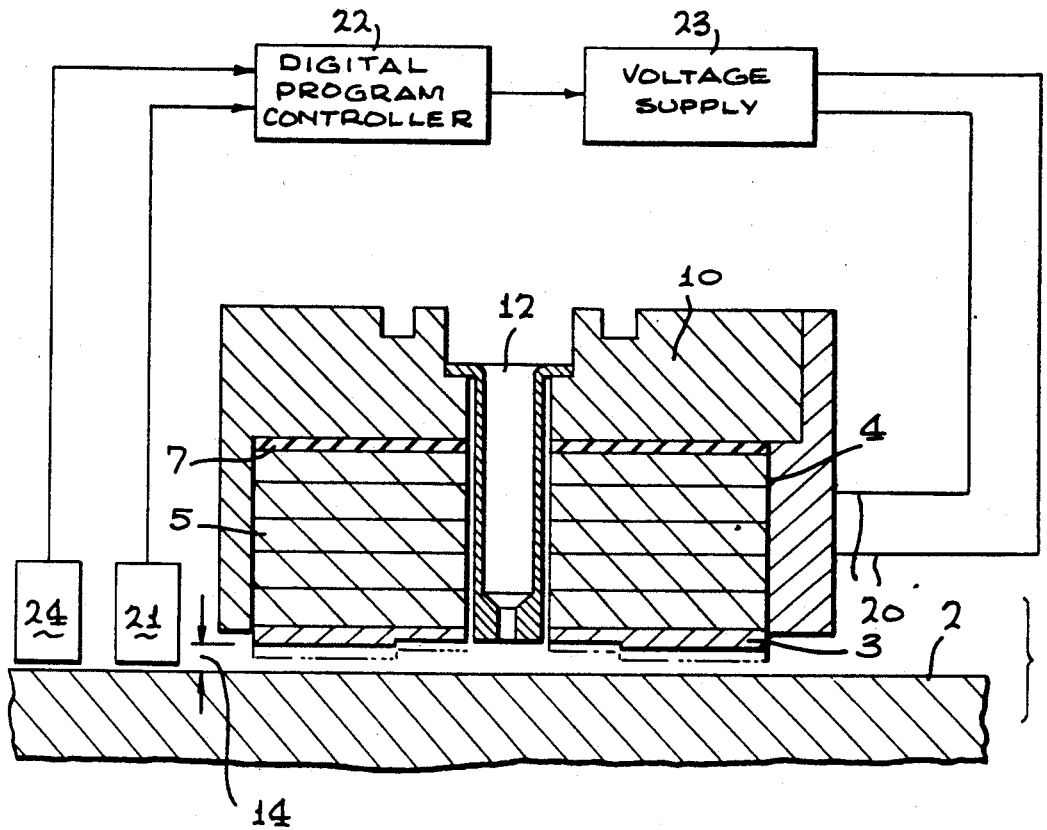
FIG. 3
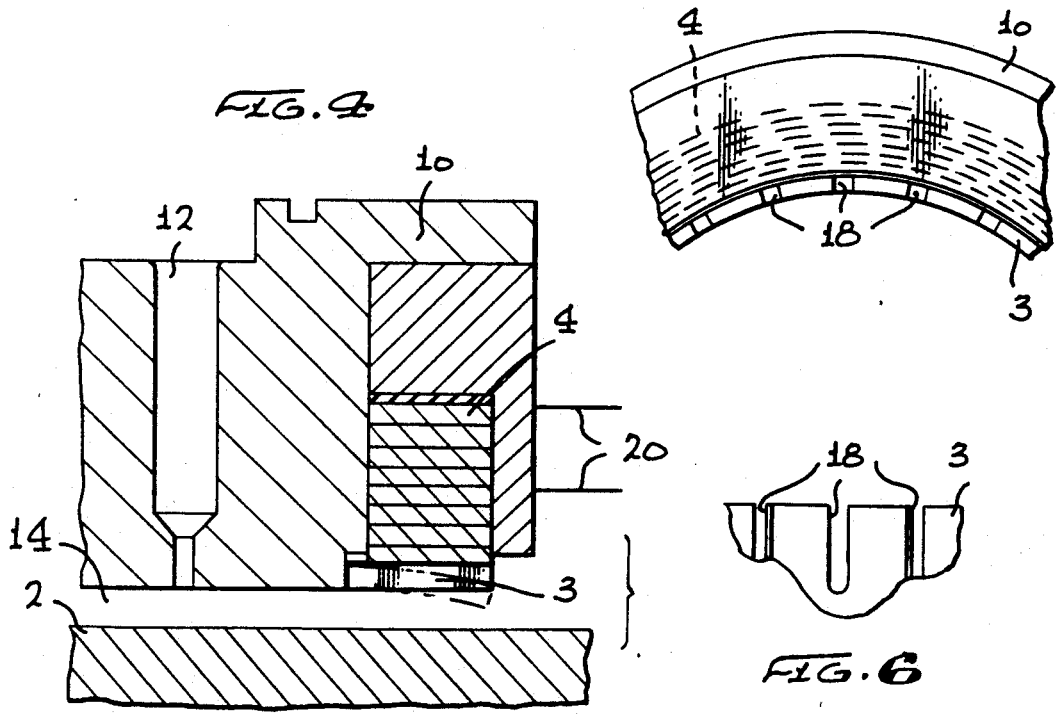
FIG. 4
FIG. 5
FIG. 6

ADJUSTABLE GAP HYDROSTATIC ELEMENT

BACKGROUND OF THE INVENTION

Field of the Invention

The present invention generally relates to hydrostatic bearings and seals and, in particular, to hydrostatic bearings and seals which have adjustable radial gaps.

Background Art

In the past hydrostatic bearings and seals have had a fixed radial gap between the journal and the bearing or the journal and the seal. The fixed gap could not accommodate thermal expansions occurring during operation which resulted in a decreased performance and a reduced life of the bearing or seal. Further as the bearing or seal and the journal wore down the radial gap changed, further reducing performance and decreasing the life of the bearing or seal.

SUMMARY OF THE INVENTION

The invention provides an adjustable radial gap between a hydrostatic bearing and a journal by employing a ring of piezoelectric material in the bearing housing which has a metallic or ceramic liner attached. The fluid in the hydrostatic bearing flows between the journal and the liner.

When the bearing heats up during operation the journal and the liner will tend to separate due to the thermal expansion of the liner and the journal. When this occurs the gap increases and the hydrostatic bearing loses stiffness causing rubbing which increases wear on the bearing. By actuating the piezoelectric material the liner can be forced closer to the journal compensating for the thermal expansion and thereby reducing wear and increasing the life and efficiency of the hydrostatic bearing.

Over the life of a hydrostatic bearing wear will occur between the journal and the bearing. This will increase the radial gap between the journal and the bearing reducing the effectiveness and life expectancy of the bearing. Activating the piezoelectric material to adjust the liner, moving it closer to the journal to compensate for wear, increases the life of the bearing and increases its efficiency.

One cause of wear on the bearing is start-stop cycles where different loads are placed on the bearings and vibration modes occur which can cause rubbing between the journal and the bearing. The stiffness of the bearing is proportional to the radial gap between the journal and the bearing. By changing the radial gap distance during start-up cycles the stiffness of the bearing can be changed to reduce rubbing and increase the life of the bearing. The piezoelectric bearing can also be actuated to increase the radial gap between the journal and the bearing to avoid rubbing contact during a phase of the start-up cycle if desired.

Similarly for seals the adjustable gap will reduce wear during start-up, compensate for thermal expansion and adjust for wear to maximize seal performance and increase seal life.

DETAILED DESCRIPTION OF THE DRAWINGS

FIG. 1 shows a cross sectional view of an adjustable ring for a hydrostatic bearing having a cutaway section illustrating a laminated ring piezoelectric actuator.

FIG. 2 shown a cross sectional view of an adjustable ring for a hydrostatic bearing having a cutaway section illustrating a segmented ring piezoelectric actuator.

FIG. 3 shown a cross sectional view of a laminated ring piezoelectric hydrostatic bearing on a journal and the power supply therefore.

FIG. 4 shows a cross sectional view of a laminated ring piezoelectric hydrostatic bearing where the liner is tapered.

FIG. 5 shows a cross sectional view of the piezoelectric ring with a slotted liner.

FIG. 6 is a detailed bottom view of the slots in the sloted liner of FIG. 5.

DETAILED DESCRIPTION OF THE PREFERRED EMBODIMENT

Figure 1:
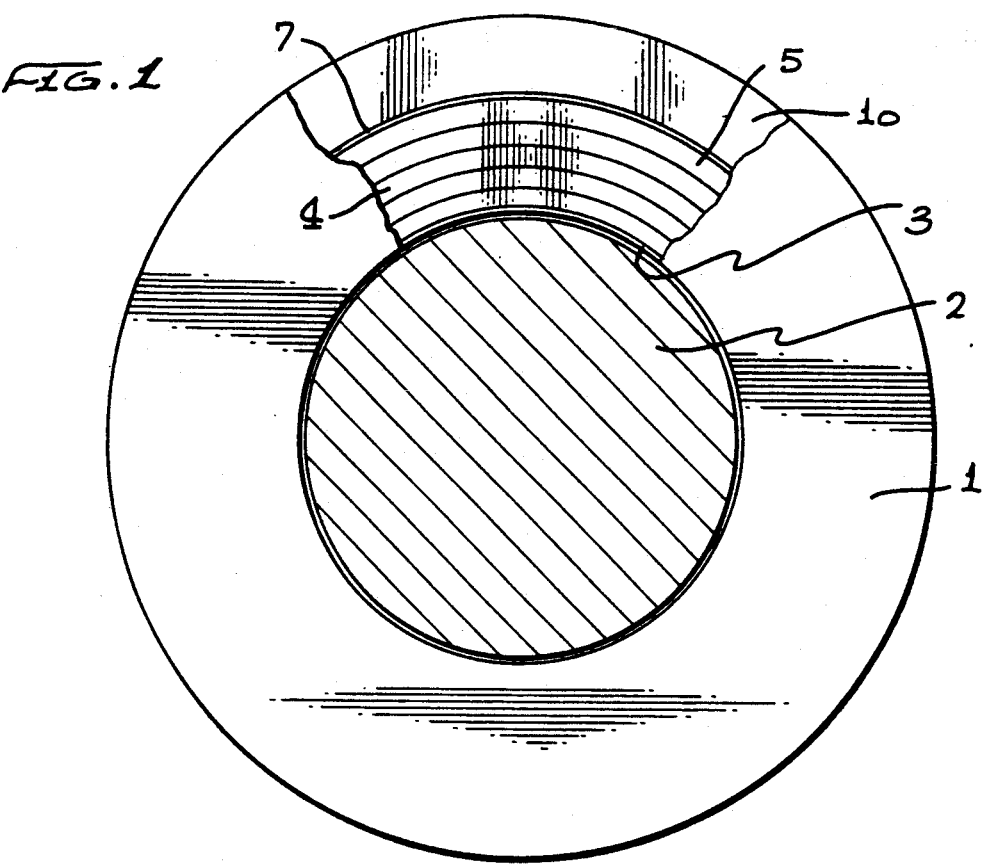

FIG. 1 shows an adjustable ring 1 which has a variable radius. Laminae 5 preferably of a piezoelectric material form an annular actuator 4 which can move radially with respect to the journal 2 when an electrical potential is applied. There is a liner 3 attached to the actuator 4 facing the journal and an inner liner 7 between the housing 10 and the actuator 4.

The actuator is attached to a housing 10 which holds the outer lamina in a fixed position. Thus when the actuator is activated the inner lamina moves radially relative to the journal and the outer lamina remains in a fixed position. Preferably the piezoelectric material is polarized in the $d_{31}$ mode so that it lengthens radially when activated and shrinks the ring in circumference. Over a small range of radial movement the stress caused by such actions will not be significant and will not damage the piezoelectric material or the liners. For larger radial movements means for reducing the stress in and between layers may be employed to prevent damaging the actuator.

Figure 2:
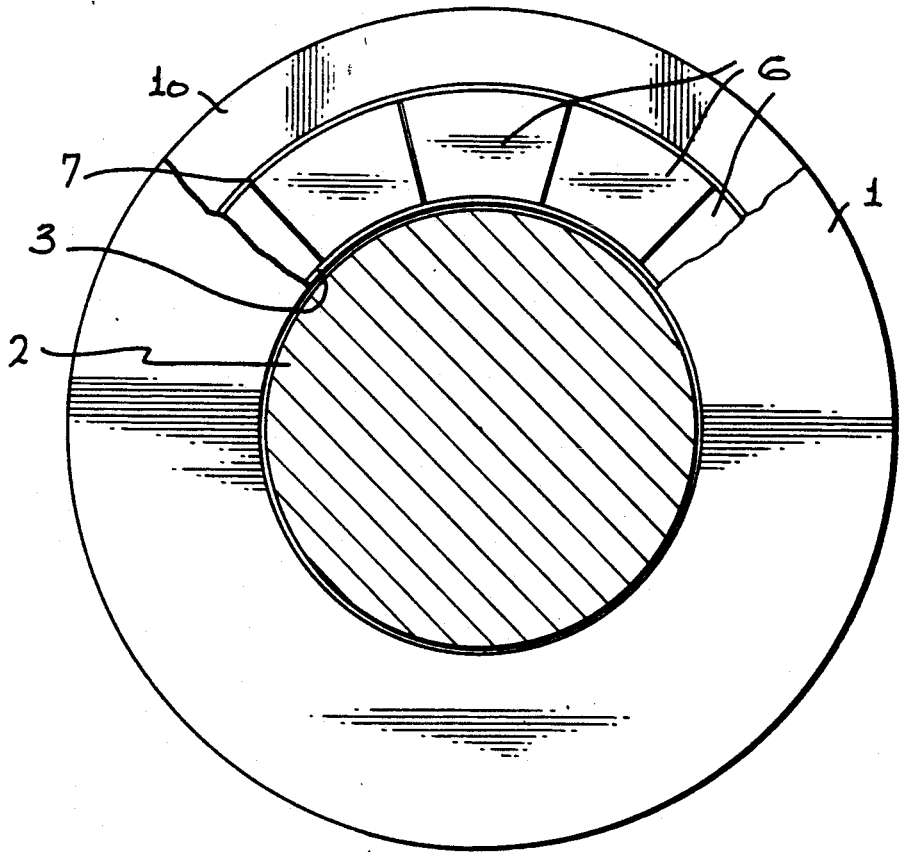

FIG. 2 shows a second embodiment of the invention in which the adjustable ring 1 is preferably composed of segments of piezoelectric materials 6 polarized along and joined along the circumferential direction. By segmenting the ring, stress in the ring can be reduced allowing for a greater radial stroke without damaging the piezoelectric actuator. There is a liner 3 attached to the actuator segments 6 facing the journal 2.

The liners 3 in both the above embodiments preferably have an inner layer, of metallic or ceramic material, attached to the actuator and an outer layer, preferably of silver, attached to the inner layer. The liners are used to insure a leak free smooth surface for the fluid to flow against.

The silver layer provides a soft surface which may be knurled to improve bearing damping. The silver layer is tolerant of rubbing which is useful since the liner may contact the journal. The silver layer is also compatible with a liquid oxygen environment which makes it useful in fuel pumps for rocket engines.

The inner layer 7 is for thermal expansion protection in extreme temperature variation condition. Preferably the inner layer is a thin film of molybdenum or tungsten and molybdenum which may be applied to the ring by sputter coat deposition. If the thermal environment is such that a ceramic material is best suited a silicon nitride is recommended.

The liner preferably does not bend or buckle when the circumference of the actuator changes which will change the circumference of the liner, thus leaving a smooth surface for the fluid to flow against and maintaining the radial gap at a uniform distance around the circumference of the journal.

To maintain a smooth surface while the laminae of piezoelectirc material changes circumference the laminated composite must be flexible and typically has slotted edges to eliminate stress risers which promote cracking.

The liner is pressed into the actuator by using cold and hot assembly environments to provide an interference fit.

The silver layer provides low friction between the journal and bearing surface to insure a low wear rate during transient loading. In addition, the mechanical properties of silver will permit knurling of the bore surface should it be required.

FIG. 3 shows a side cross sectional view of the adjustable gap hydrostatic bearing with laminae 5 of piezoelectric material used for the actuator 4. The laminae are attached in housing 10 on each side of fluid inlet 12 by inner liner 7 which is preferably a ceramic or metallic material.

A fluid is introduced to fluid inlet 12 under pressure and flows out of the variable gap 14 between the liner 3 and the journal 2 to provide a hydrostatic bearing. The phantomed liner surface shows the liner position after the actuator has been activated.

The radial gap 14 is controlled by applying a voltage to the piezoelectric actuator. The higher the voltage the greater the actuator movement. When operating the adjustable gap hydrostatic bearing starting from when the journal is at rest the shaft speed sensor 21 will tell the digital program controller 22 that the journal is not moving and send a signal to the voltage supply to either apply a full voltage or a minimum voltage depending on which way the actuator activates, to obtain a maximum retraction of the radial gap between the liner and the journal. Thus when the journal is starting up and the journal is vibrating the liner 3 will not be in rubbing contact with the journal. As the speed on the journal increases and the vibration damps the shaft speed sensor 21 detects the increase in speed and sends a signal to the digital program controller 22 which directs the voltage supply 23 to increase or decrease the voltage supplied to the actuator 4 through wires 20. The digital program controller is programmed to adjust the radial gap 14 to maximize the hydrostatic bearing's performance and minimize the wear on the bearing thus increasing bearing life.

The speed of the journal 2 may be measured by means of a sensor plate with imbedded proximeter probes 21 monitoring a discontinuity on the shaft surface. The output signal would be fed into the controller 22 for processing and analysis and the voltage supply 23 would be adjusted to vary the gap.

There is a means of detecting the journal's radial deflection 24 which may dictate a bearing stiffness or damping coefficient change and the radial gap is then adjusted to the proper clearance for journal motion control. For the case where the shaft speed is measured by means of a sensor plate with imbedded proximeter probe the proximeter probe 21 can serve a dual function by also being amplitude calibrated to generate a signal proportional to radial shaft deflection. The data can be fed to the controller for real time processing and analysis and the voltage supply 23 would be adjusted to vary the radial gap 14.

In hydrostatic bearings it is important to have the radial gap 14 set at a particular distance to optimize the stiffness of the bearing for the speed of the journal. Further it is useful to adjust the radial gap to compensate for wear in the liner so that the radial gap is maintained at the same distance over the life of the bearing. By thus adjusting the radial gap for proper stiffness the bearing life can be increased and the performance of the bearing improved.

The maximum stroke of the actuator is preferably 0.00005 mm which will be enough to retract the liner so that it avoids wear during start-stop transients.

The above described hydrostatic bearings will work equally well with external and internal feed bearings.

FIG. 4 shows an alternate embodiment of the invention in which the ends of the liners 3 can be variably tapered up or down by the actuator to restrict or increase the flow of fluid and thus change the stiffness of the bearing instead of moving the entire liner up and down. As shown in FIG. 5 and 6 the liner has slotted portions 18 at the edge of the liner 3 to facilitate its bending into the tapered position.

Figure 7:
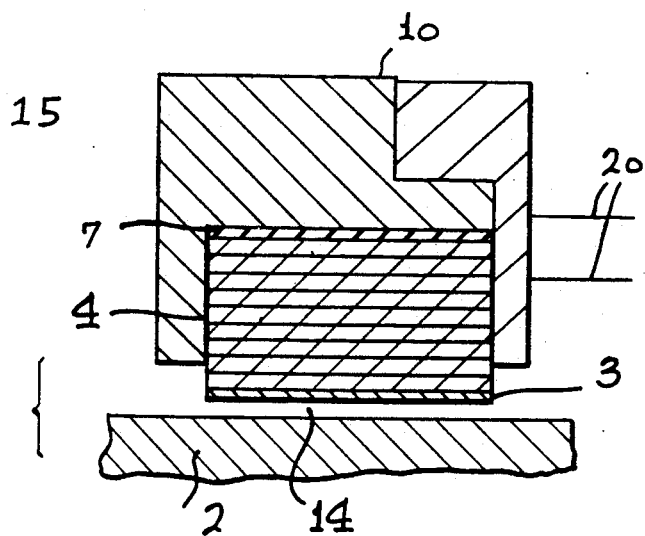
FIG. 7 shows a cross sectional view of a seal with a piezoelectric ring.

Hydrostatic bearings have seals placed next to the bearing to help restrict the flow of the fluid used in the hydrostatic bearing. As with the hydrostatic bearing the seals can have a variable radial gap 14 controlled by an adjustable piezoelectric ring. FIG. 7 shows a journal 2 having a seal 15 comprising a housing 10 having an actuator 4 with a liner 3 and inner liner 7. As with the hydrostatic bearing the seals can be moved relative to the journal to vary the gap 14 therebetween by controlling the voltage applied to the piezoelectric actuator. A controller adjusts the voltage applied to the actuator as with the hydrostatic bearing but the controller is programmed to vary the radial gap to different distances for the same speed compared to the hydrostatic bearing.

Figure 8:
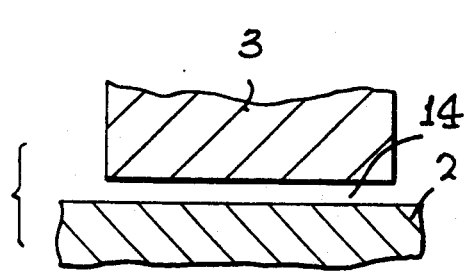
FIG. 8 shows a cross sectional view of a seal with a smooth liner and a journal.
Figure 9:
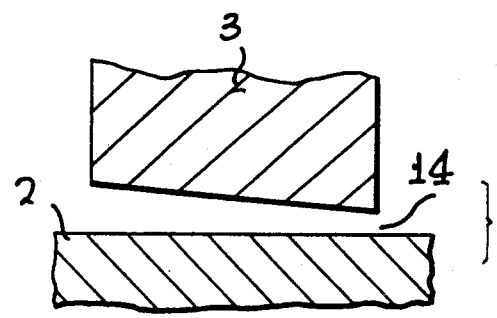
FIG. 9 shows a cross sectional view of a seal with a tapered liner and a journal.
Figure 10:
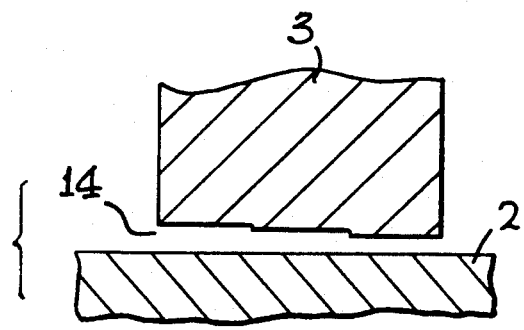
FIG. 10 shows a cross sectional view of a seal with a stepped liner and a journal.
Figure 11:
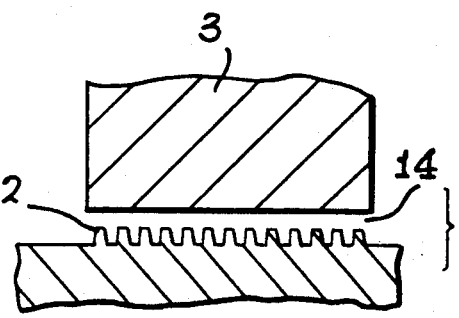
FIG. 11 shows a cross sectional view of a seal with a smooth liner and a serrated journal.

The liners 3 for the seal may have different configurations. FIG. 8 shows a liner 3 having a flat inner surface. FIG. 9 shows a liner 3 having a tapered inner surface. FIG. 10 shows a liner 3 having a stepped inner surface. FIG. 11 shows a liner 3 having a flat inner surface and a journal with a serrated surface. The various types of liners and journals provide different sealing characteristics.

It should be understood that although reference is made herein to piezoelectric actuators, actuators of any electrodeformable material such as electrorestrictive, electromagnetic, magnetoremanent, magnetostrictive, piezocomposite ferroelectric or thermoexpansive materials which are responsive to electronic signals or electric potentials may be employed.

Piezoelectric rings with the properties desired for this invention are commercially available from suppliers such as Vernitron Corporation of El Toro, Calif.

What is claimed is:

1. An adjustable gap hydrostatic element comprising,
   a housing circumferentially surrounding and proximate to a journal,
   the housing having a first annular liner attached thereto, an annular electrodeformable actuator having an inside circumference and an outside circumference, the outside circumference attached to the first annular liner, a second annular liner attached to the inside circumference of the annular electrodeformable actuator, the second annular liner having a radial gap between it and the journal, a means of applying a variable voltage to the electrodeformable actuator so as to adjust the radial gap between the journal and the second annular liner.

2. An adjustable gap hydrostatic element as in claim 1 wherein the annular electrodeformable actuator comprises laminae of electrodeformable material.

3. An adjustable gap hydrostatic element as in claim 1 wherein the annular electrodeformable actuator comprises segments of electrodeformable material.

4. An adjustable gap hydrostatic element as in claim 1 wherein an inlet injects a fluid into the radial gap to form a hydrostatic bearing.

5. An adjustable gap hydrostatic element as in claim 4 wherein the second annular liner has an inside portion adjacent the fluid inlet and an outside portion where the electrodeformable material acts on the outside portion to taper it toward the journal thereby reducing the radial gap of the outside portion of the second liner.

6. An adjustable gap hydrostatic element as in claim 5 wherein the outside portion of the second annular liner is slotted so it will bend more easily when acted on by the electrodeformable material to taper the liner.

7. An adjustable gap hydrostatic element as in claim 1 wherein there is a means of detecting the journal radial deflection and applying a variable voltage to the actuator so as to adjust the gap between the journal and the second annular liner as a function of journal radial deflection.

8. An adjustable gap hydrostatic element as in claim 1 wherein there is a means of detecting the journal speed and applying a variable voltage to the actuator so as to adjust the gap between the journal and the second annular liner as a function of journal speed.

9. An adjustable gap hydrostatic element as in claim 8 wherein there is a means of detecting the journal radial deflection and applying a variable voltage to the actuator so as to adjust the gap between the journal and the second annular liner as a function of journal radial deflection.

* * * * *